(12) United States Patent
Meade, II

(10) Patent No.: US 6,405,214 B1
(45) Date of Patent: Jun. 11, 2002

(54) METHOD OF GATHERING USAGE INFORMATION AND TRANSMITTING TO A PRIMARY SERVER AND A THIRD PARTY SERVER BY A CLIENT PROGRAM

(75) Inventor: W. K. Meade, II, Eagle, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/215,046

(22) Filed: Dec. 17, 1998

(51) Int. Cl.⁷ .............................................. G06F 17/00
(52) U.S. Cl. .................................... 707/104.1; 709/203
(58) Field of Search ............................... 707/10, 104.1; 709/223, 224, 201, 203, 229; 704/14, 27

(56) References Cited

U.S. PATENT DOCUMENTS

| | | | |
|---|---|---|---|
| 5,819,285 A | | 10/1998 | Damico et al. ............. 707/104 |
| 6,029,141 A | * | 2/2000 | Bezos et al. ................... 705/27 |
| 6,081,788 A | * | 6/2000 | Appleman et al. ............ 705/14 |
| 6,112,240 A | * | 8/2000 | Pogue et al. ................. 709/224 |
| 6,134,592 A | * | 10/2000 | Montulli ...................... 709/229 |
| 6,144,988 A | * | 11/2000 | Kappel ........................ 709/202 |
| 6,189,000 B1 | * | 2/2001 | Gwertzman et al. ........... 707/1 |
| 6,205,480 B1 | * | 3/2001 | Broadhurst et al. ......... 709/225 |

OTHER PUBLICATIONS

Marais et al "Supporting Cooperative and Personal Surfing with a Desktop Assistant", ACM 1997, pp. 129–138.*

* cited by examiner

*Primary Examiner*—Safet Metjahic
*Assistant Examiner*—Uyen Le

(57) ABSTRACT

A method of gathering and transmitting information is provided. The method is performed in a client/server computer network including a user computer having a CPU and a storage device, which are adapted to implement a first client program capable of gathering usage information from the user's CPU and storage device and a second client program providing connectivity with the network. The network further includes a principal server site having a server program capable of writing transmittable files to the user computer. At least one third-party server site is included, and is capable of uploading transmittable files from the user computer. In the first step, the server program writes at least one transmittable file to the user computer. Next, the first client program gathers usage information from the user computer, and then writes the usage information to the at least one transmittable file. Next, the first client program addresses the at least one transmittable file to the third-party server, and the second client program transmits it to the third-party server. Also provided is an apparatus for gathering and transmitting information in a client/server computer network. [The apparatus includes a user computer including a first client program for gathering usage information from the user's CPU and storage device, for writing the usage information and address data to the at least one transmittable file, and a second client program for providing connectivity with the network. The apparatus also includes a principal server site including a server program for writing transmittable files to the user computer and for providing connectivity with the network. At least one third-party server site is also provided. The at least one third-party site includes a communication program for uploading transmittable files from the user computer and for providing connectivity with the network.]

14 Claims, 3 Drawing Sheets

METHOD OF GATHERING USAGE INFORMATION AND TRANSMITTING TO A PRIMARY SERVER AND A THIRD PARTY SERVER BY A CLIENT PROGRAM

FIELD OF THE INVENTION

This invention relates to the field of gathering and transmitting customer information. More specifically, this invention relates to the use of client/server programs to track customer product use.

BACKGROUND OF THE INVENTION

Several systems and methods exist for facilitating communication between programs. One example of such a system and method is commonly known as the "client/server" model. Client/server refers to a relationship between two computer programs in which one program, the client, makes a service request from another program, the server, which fulfills the request. Although the client/server model is applicable to programs within a single computer, it is a more typically employed in network environments. In a network, the client/server model provides a convenient way to interconnect programs that encompass a number of different machines and/or locations.

Computer transactions using the client/server model are relatively common, and are used in applications ranging from online banking to internet shopping. With the near omnipresence of computer networks both local and widespread, the client/server model has become one of the central ideas of network computing. Most business applications being written today use the client/server model, as does TCP/IP, one of the building blocks of the internet.

The client/server model is typically implemented as follows. One program, known as the server or "daemon", is activated and awaits requests from another program, the client. The client's request, typically for information such as account balances, etc., are received and acted upon by the server. In a common arrangement, the services of a single server program are shared by multiple client programs, with both the server and client programs forming parts of a larger program or application.

Perhaps the most widely-used example of the server/client model is the internet itself. In the internet environment, the user's web browser is a client program that requests services (the sending of Web pages or files) from a Web server (which technically is called a Hypertext Transport Protocol or HTTP server) in another computer somewhere on the Internet. Similarly, a user's computer may employ TCP/IP to make client requests for files from File Transfer Protocol (FTP) servers in other computers on the Internet.

One of the ways that the client/server model is made more efficient over the internet is through the use of "magic cookies" or, more simply, "cookies". A cookie is a small piece of information sent by a web server to store on a web browser, so that the information can later be read back from the same browser. The cookie is a relatively small text file placed in the browser file of the user's computer. The placement of this text file is known as "setting a cookie", and is accomplished by adding row of text to the single cookie file present for each browser installed. Once set, the cookie is later retrieved by the server from the user's browser file on a subsequent visit to the same server.

The primary purpose of the cookie is to keep track of clients, i.e., to separately identify clients. One of the original problems that cookies were invented to solve was that of keeping the correct products in the correct customer's shopping cart during on-line shopping. The most common thing a server web site sets into the client's cookie is effectively a database key for its site. That is, the cookie sets a value that is unique to the individual client, and is universal to the population of clients that it servers. These values are essentially information infrastructure having to do with access and identity, rather than information "payload" unrelated to accessing a specific website.

Cookies can contain up to 340 lines of information, which include the domain of the server that originally set the cookie. Other information may include the user's identity, e-mail address, preferences, past website uses, or virtually any data that may be deemed useful by the server. Cookies are usually run from CGI scripts, but they can also be set or read by JavaScript.

Cookies are often used by browsers to store passwords and user ID's, eliminating the need for the user to re-enter this information on each visit to a site. They are also typically used to store preferences for start pages in browser applications such as Netscape Navigators and Internet Explorers. Electronic commerce applications can use cookies to keep track of the contents of a user's electronic "shopping cart". This enables users to interrupt their shopping, then return to the site before the cookie expires (perhaps months or years later) and resume shopping with the same items remaining in the cart. Websites use cookies to retain information on user preferences (e.g., "no frames" or "text only"), thus saving the user from entering that information on every visit to the site.

Cookies can also be used for tracking the path of a user through a website. This allows the webmaster to identify so-called "Dead End Paths", places in the website where users lose interest and leave. Cookies can also provide a more accurate counts of how many people have been to pages on a website. With the identification capabilities of a cookie, a website administrator would be able to distinguish between multiple hits by multiple users and multiple hits by a single user.

Perhaps the most prevalent use of cookies is database marketing. Information in cookies can be used to compile a database profile of internet use of a specific individual. The profile can include such information as sites visited, advertising banners "clicked", and other user-specific data. This profile is then used to tailor promotions specific to individual users. For instance, an administrator of a gardening-related site can use cookies to track specific paths an individual travels through the website. If the cookies for that individual indicate an interest in exotic orchids, for example, the administrator can use this information to target advertising concerning greenhouse equipment to that individual. Such advertising may be in the form of interest-specific banners. The administrator can also use cookies to ensure that an individual does not receive the same advertisement repeatedly.

With their ability to gather a wide variety of information on individual internet use, cookies have been the subject of some concern regarding privacy issues. Although some early implementations of Java and JavaScript allowed access to user's hard drives, these security problems have been resolved, and are no longer an issue. An HTTP Cookie cannot be used to get data from a user's hard drive, or to obtain a user's e-mail address or other sensitive information stored on the user's computer without the user's permission. A server can only get data from the cookie it wrote to the cookie file. The server must be on the same domain from which the cookie was set.

While such security measures are effective in preventing unauthorized access to individual's hard drives, there are circumstances under which limited access to information voluntarily provided by a user can be desirable, or even beneficial to the user. In these situations, the applications utilizing variations of the client/server model are frequently employed to convey such information.

One example of such an application is MOPy™ Fish, developed by Global Beach for Hewlett-Packard Co. This application provides a "screen saver" that is a virtual aquarium, with an interactive goldfish. The program interacts with the printer drivers of the user's computer to tally the number of original pages printed from the computer. Users are awarded "MOPy™ (multiple original printing) points" for each original printed. These points can be redeemed at a website for "aphrodisiac fish food" which enhances the user's enjoyment of the program. Of course, the MOPy points not only encourage users to understand the uses of multiple original prints, but also give the website administrators information regarding printer use.

While it is possible for website administrators target advertising and promotions for their own sites, it is difficult and inefficient for complementary websites to co-promote to individual customers. This is because cookies from a specific site can only be uploaded to the same site. The time and effort involved in separately compiling information and target advertising from one site and then transmitting the information to other companies to target advertising in enormous by comparison with the automatic compilation and targeting afforded by the use of cookies.

It is apparent from the foregoing that the need exists for a system that can use detailed information available from internal tracking programs such as MOPy™ Fish to share information across complimentary websites with the speed and efficiency of internet cookie applications.

SUMMARY OF THE INVENTION

In order to accomplish the present invention, there is provided a method of gathering and transmitting information. The method is performed in a client/server computer network including a user computer having a CPU and a storage device. The storage device and CPU of the user computer are adapted to implement a first client program capable of gathering usage information from the user's CPU and storage device and a second client program providing connectivity with the network. The network further includes a principal server site having a server program capable of writing transmittable files to the user computer. The network also includes at least one third-party server site capable of uploading transmittable files from the user computer.

In the first step, the server program of the server site writes at least one transmittable file to the user computer. Next, the first client program of the user computer gathers usage information from the user computer. The first client program of the user computer then writes the usage information to the at least one transmittable file, after which the first client program of the user computer writes an address to the at least one transmittable file, the address corresponding to the third-party server. Finally, the second client program of the user computer transmits the at least one transmittable file to the third-party server.

The present invention also includes an apparatus for gathering and transmitting information in a client/server computer network. The apparatus includes a user computer including first client program means for gathering usage information from the user's CPU and storage device, for writing the usage information and address data to the at least one transmittable file, and second client program means for providing connectivity with the network. The apparatus also includes a principal server site including server program means for writing transmittable files to the user computer and for providing connectivity with the network. At least one third-party server site is also provided. The at least one third-party site includes communication means for uploading transmittable files from the user computer and for providing connectivity with the network.

In the present invention, connectivity between the user computer, the server site, and the third-party site can be established via the internet. The at least one transmittable file can be provided as at least one cookie. The second client program of the user computer can include a web browser, and the address corresponding to the third-party server may be a URL.

The usage information gathered by the first client program of the user computer can be printer use information, which may be compiled from a printer driver of user computer.

BRIEF DESCRIPTION OF THE DRAWINGS

A better understanding of the invention may be had from the consideration of the following detailed description taken in conjunction with the accompanying drawings, in which.

DETAILED DESCRIPTION OF THE INVENTION

Figure 1:
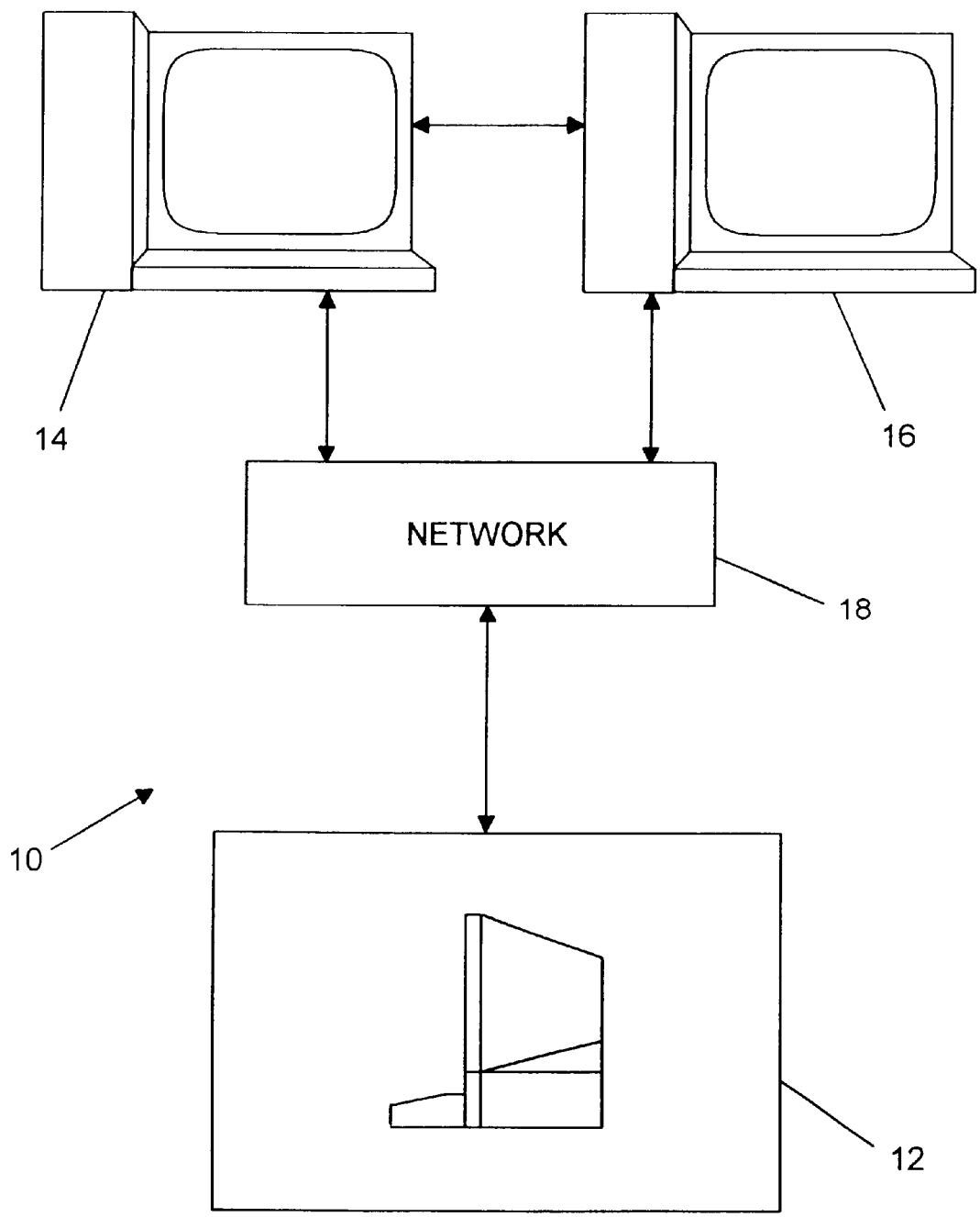
FIG. 1 is a schematic view of a known network arrangement.

The present invention is not limited to a specific embodiment illustrated herein. FIG. 1 illustrates a known network arrangement 10 in which a user computer 12 is linked to a primary server 14 and a third-party server 16 via a network 18. In the illustrated network arrangement, the network 18 is the internet. As is known in the art, transmittable files such as cookies can be used to transmit information between the user computer 12 and the primary server 14, or between the user computer 12 and the third-party server 16, using respective client and server programs. Furthermore, if the user computer 12 is additionally provided with a client program that gathers information from the user computer 12, the program may be used to transmit information to the primary server 14. However, if this information is to be shared with the third-party server 16, it must be secondarily transmitted by the primary server 16. There is no way to directly transmit such information from the user computer 12 to the third-party server 16, since cookies as commonly written can only be retrieved by the server that placed them.

Figure 2:
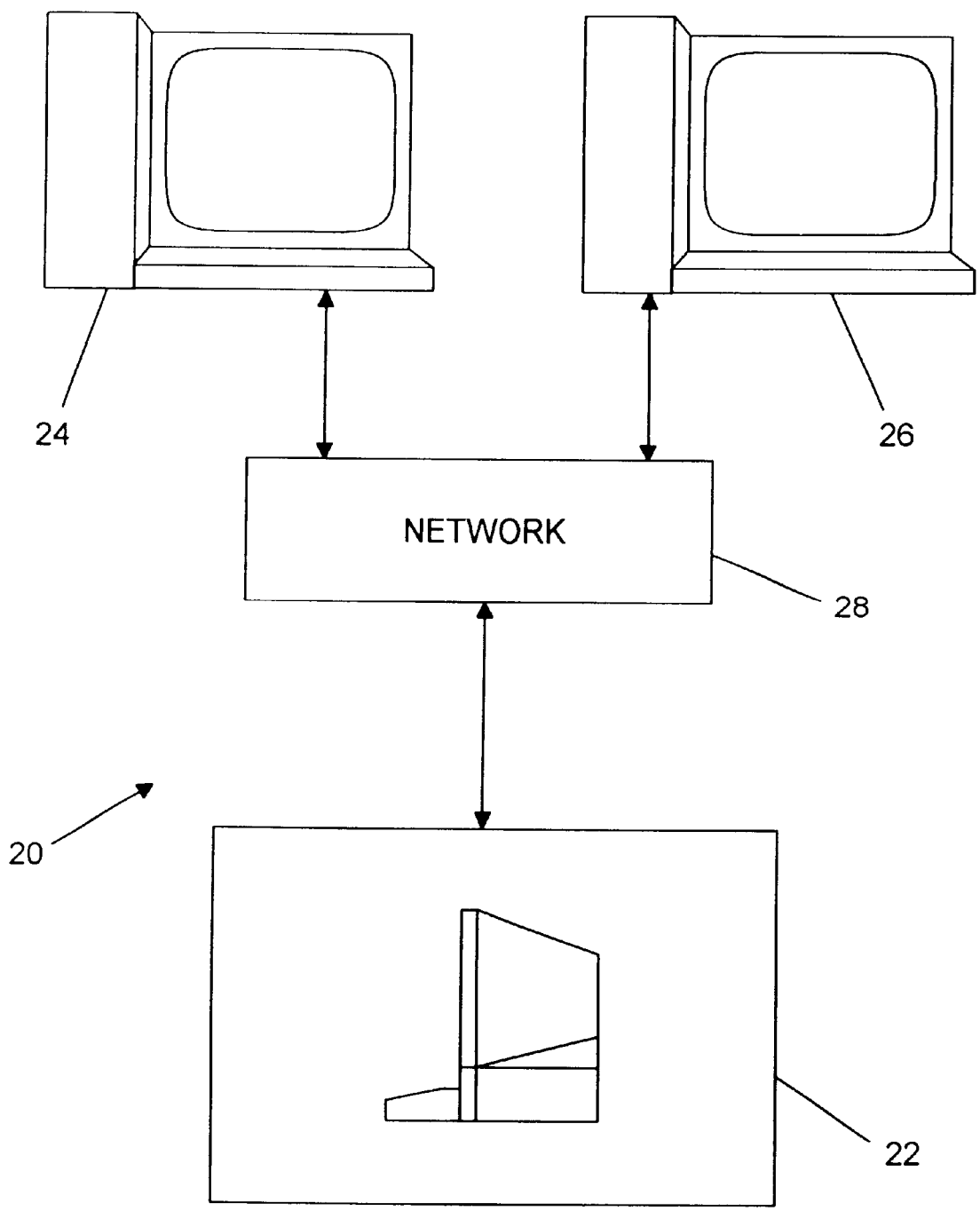
FIG. 2 is a schematic view of a network arrangement in accordance with the principles of the present invention.

FIG. 2 illustrates a network arrangement 20 in accordance with the principles of the present invention. A user computer 22 is linked to a primary server 24 and a third-party server 26 via a network 28. In the illustrated network arrangement, the network 28 is the internet. As with the FIG. 1 network, transmittable files such as cookies can be used to transmit information between the user computer 22 and the primary server 24, or between the user computer 22 and the third-party server 26, using respective client and server programs. The user computer 22 is additionally provided with a client program that gathers information from the user computer 22, the program may be used to transmit information to the primary server 24.

However, the client program is configured to write the information gathered as data in a transmittable file such as a cookie. The program is also configured to rewrite address data in the transmittable file to enable the information is to be shared directly with the third-party server 26, i.e., the program replaces the existing address on the transmittable file with that of the desired third-party server.

Thus, when the user computer logs into the third-party website, the client program transmits the transmittable file to the third party server, which can then use the information to tailor site content to the specific user. For example, the information gathered from the user computer by the second program may be printer usage data compiled from printer drivers of the user computer, as with the MOPy™ Fish program. If, in accordance with the invention, the MOPy™ Fish program contains code that has enabled it to rewrite an existing cookie (originally placed by the MOPy™ Fish site) to be uploaded by a third-party server, perhaps that of a related marketing entity such as a reseller of computer equipment. The reseller can then present promotions or discounts on, for instance, toner cartridges, to the user based on the user's actual printing profile. The Cookie's expiration date could be set to expire with the term of the cooperative promotion.

Of course, the preceding example was merely illustrative, as one of ordinary skill will appreciate that any manner of third-party interactions can be affected using any type of information gathered by the second client program. For example, the usage information could be related to program use (i.e., tracking usage of word processing, database, or presentation programs), use time of the computer itself, or virtually any aspect of the user's client computer.

Figure 3:
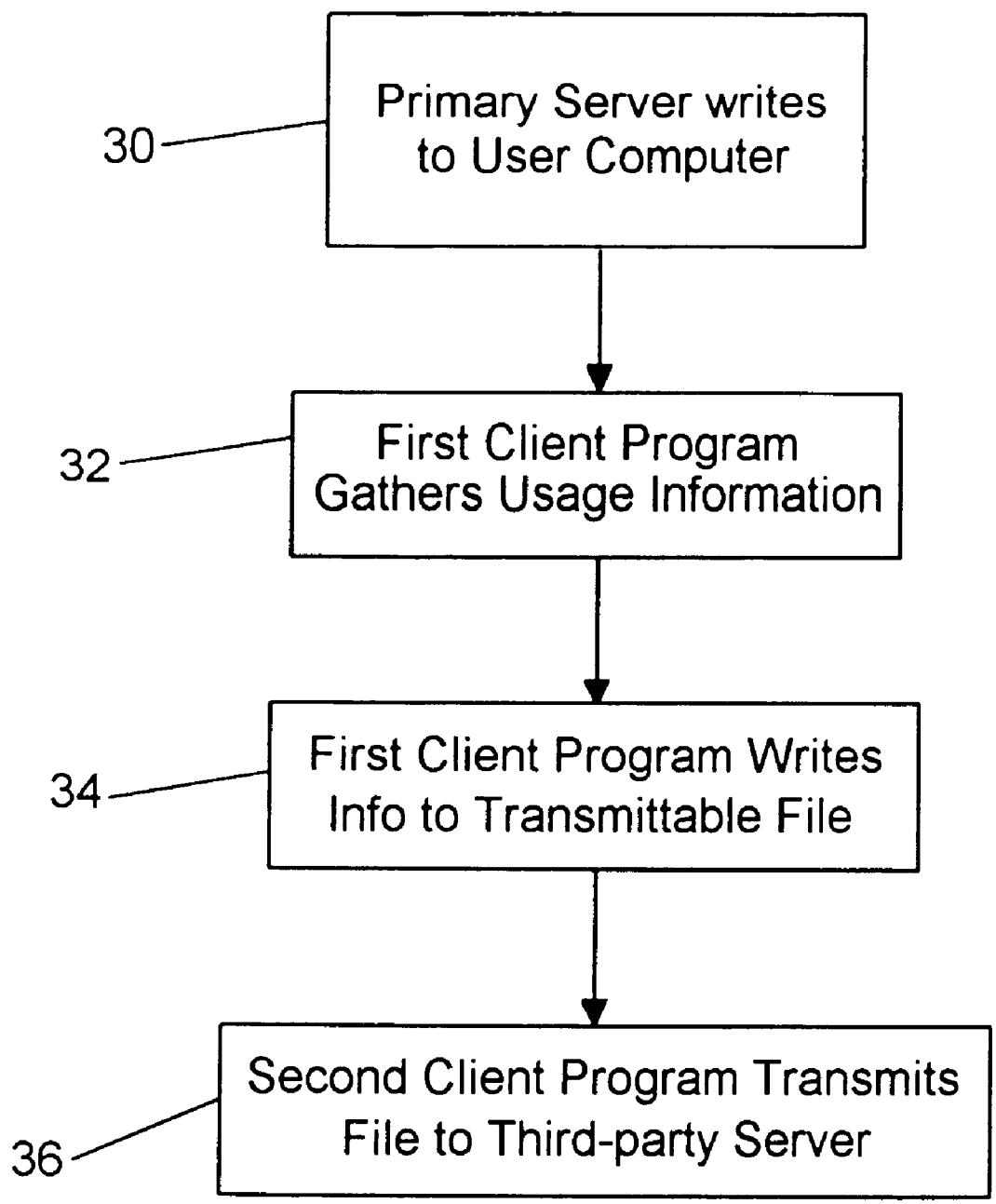
FIG. 3 is a flow diagram illustrating a for gathering and transmitting information in accordance with the principles of the present invention.

The basic method associated with the present invention is illustrated in FIG. 3. In the step shown at point 30, the server program of the server site writes at least one transmittable file to the user computer. This file may be a cookie, as described. Next, at point 32, the first client program of the user computer gathers usage information from the user's CPU or storage device. This information may be printer usage information as gathered by the MOPy™ Fish program, or any other desirable information gathered by similar client programs. At point 34, the first client program writes the usage information to the at least one transmittable file. In the case of a cookie, this information can be written to any of over 300 available lines. Also at this point, the first client program writes an address to the transmittable file, the address corresponding to the third-party server. As discussed in a previous example, this address can be to a related marketing entity. Finally, at point 36 the second client program of the user computer transmits the transmittable file to the third-party server.

Although the preferred embodiment of the present invention has been illustrated, and that form described, it is readily apparent to those skilled in the art that various modifications may be made therein without departing from the spirit of the invention, or form the scope of the appended claims.

What is claimed is:

1. In a client/server computer network including a user computer having a CPU and a storage device, the storage device and CPU of the user computer having a first client program capable of gathering usage information from the user's CPU and storage device and a second client program providing connectivity with the network, the network further including a principal server site having a server program capable of writing transmittable files to the user computer, the network further including at least one third-party server site capable of uploading transmittable files from the user computer, a method of gathering and transmitting information, the method comprising the following steps:

causing the server program of the principal server site to write at least one transmittable file to the user computer;

causing the first client program of the user computer to gather usage information from the user's CPU or storage device;

causing the first client program of the user computer to write the usage information to the at least one transmittable file;

causing the first client program of the user computer to write an address to the transmittable file, the address corresponding to the third-party server; and causing the second client program of the user computer to transmit the transmittable file to the third-party server.

2. A method according to claim 1, wherein connectivity between the user computer, the server site, and the third-party site is established via the internet.

3. A method according to claim 2, wherein the at least one transmittable file comprises at least one cookie.

4. A method according to claim 2, wherein the second client program of the user computer comprises a web browser.

5. A method according to claim 4, wherein the address corresponding to the third-party server is a URL.

6. A method according to claim 1, wherein the step of causing the first client program of the user computer to gather usage information comprises gathering printer use information.

7. A method according to claim 6, wherein the step of causing first client program to gathering printer use information comprises the step of interfacing with a printer driver of user computer.

8. An apparatus for gathering and transmitting information in a client/server computer network, the apparatus comprising the following:

a user computer having a CPU and a storage device, the storage device and CPU of the user computer having a first client program capable of gathering usage information from the user's CPU and storage device and a second client program providing connectivity with the network, the user computer capable of receiving transmittable files from a principal server;

the first client program of the user computer being adapted and constructed to write the usage information and an address to at least one of the transmittable files, the address corresponding to a third-party server, and the second client program of the user computer being adapted and constructed to transmit the at least one transmittable file to the third-party server.

9. An apparatus according to claim 8, wherein connectivity between the user computer, the server site, and the third-party site is established via the internet.

10. An apparatus according to claim 9, wherein the at least one transmittable file comprises at least one cookie.

11. An apparatus according to claim 9, wherein the second client program of the user computer comprises a web browser.

12. An apparatus according to claim 11, wherein the address corresponding to the third-party server is a URL.

13. An apparatus according to claim 8, wherein the usage information gathered by the first client program of the user computer comprises printer use information.

14. An apparatus according to claim 13, wherein the usage information gathered by the first client program of the user computer comprises printer use information compiled from a printer driver of the user computer.

* * * * *